United States Patent [19]

Ghiselin et al.

[11] Patent Number: 4,774,843
[45] Date of Patent: Oct. 4, 1988

[54] STRAIN GAGE

[75] Inventors: Robert E. Ghiselin, Costa Mesa; Carlyle A. Mounteer, Laguna Beach, both of Calif.

[73] Assignee: Gulton Industries, Inc., Costa Mesa, Calif.

[21] Appl. No.: 85,983

[22] Filed: Aug. 14, 1987

[51] Int. Cl.$^4$ .......................... G01L 7/08; G01L 9/06
[52] U.S. Cl. .......................................... 73/727; 338/4
[58] Field of Search .................. 73/727, 726, 721, 720, 73/723, 717, DIG. 4; 338/4

[56] References Cited

U.S. PATENT DOCUMENTS 4,691,575  9/1987  Sonderegger et al. ............... 73/727

Primary Examiner—Donald O. Woodiel
Attorney, Agent, or Firm—Blakely Sokoloff Taylor & Zafman

[57] ABSTRACT

In an improved strain gage for measuring pressure differentials within areas of varying pressure there is provided a flexible sapphire diaphragm having disposed thereon a Wheatstone bridge. The diaphragm being attached to a base portion by way of a glass bonding material. The base portion's function being to support the flexible diaphragm without interfering with the measurement of strain. The diaphragm having a recess extending to a predetermined depth thereby defining a recessed area having a peripheral edge in order to create pressure points at the peripheral edge of the recess adjacent the recessed area of the diaphragm.

12 Claims, 2 Drawing Sheets

STRAIN GAGE

BACKGROUND OF THE INVENTION

1. Field of the Invention

The present invention relates to pressure and strain sensitive devices and, more particularly, to an improved strain gage pressure sensor.

2. Art Background

Proper operation of many systems requires a precise sensing and measurement of pressure. Pressure sensors have been developed which employ a single crystal material for the pressure sensing diaphragm. Typically, such pressure sensors employ the strain gage principle to transduce the sensed pressure to a useful electrical signal. In order to mount the sensor chip so that it may be packaged usefully, the chip is usually bonded to a support by means of epoxy, glass or electrostatic bonding or similar bonding methods. When pressure is applied to the diaphragm, strains are set up in the diaphragm surface and the strain sensitive regions are disposed appropriately to respond electrically to them. The pressure source may be any of a number of sources such as the pressure in an engine which impinges upon and exerts a pressure against the diaphragm of the sensor.

The strain gauges disposed on the diaphragm are usually arranged in the form of a Wheatstone Bridge circuit which is well known in the art, and which is coupled to an external voltage sensitive device. When the pressure impinges the diaphragm, moments are established in the body of the diaphragm which deflect it and relate directly to strain, resulting in a change of resistance of the strain sensitive portion of the diaphragm making up the Wheatstone bridge. This change is sensed and corresponds to the change in pressure which caused the deformation of the diaphragm.

However, serious problems exist in such prior art strain gauges in that radial and tangential stress caused by the pressure or strain being measured causes the glass, epoxy or other bond which couples the chip to the base to deform to the point where the diaphragm cannot return to its original shape, thereby causing the gage to go out of calibration. In response to such stress, the diaphragm may also separate from the base.

Over the course of operation of the strain gage, the bonding material may become permanently deformed, thereby requiring replacement of the gage which, since such gauges are extremely expensive, also incurs a considerable expense.

Since the purpose of such devices is to measure pressure or strain accurately and consistently over the course of years of usage with no down time, it will be appreciated that a dire need exists for a strain gage that overcomes the afore-discussed problems which are attendant prior art strain gauges.

BRIEF SUMMARY OF THE INVENTION

The present invention overcomes the foregoing obstacles and drawbacks through the use of a strain gage for measuring pressure differentials, comprising a diaphragm within a unitary crystalline chip having disposed therein a recessed portion and a Wheatstone bridge. The present invention also includes a base portion for supporting the unitary crystalline chip containing the diaphragm, and a bonding material for coupling the base portion to the crystalline chip. The recess of the diaphragm causes the highest stress to occur along the peripheral edge of the recessed portion in the crystalline chip, and not at the interface between the base and crystalline chip (i.e. not in the bonding material). The tendency of the bonding material to deform is thereby greatly reduced, which also greatly reduces downtime of the gage as well as the need for replacement thereof. The ratio of diaphragm thickness to total chip thickness relates to the amount of stress that the bonding material experiences. The present invention transfers radial and tangential stress, which in prior art gauges occurred in the bonding material, to the periphery of the recessed portion within the crystalline chip. Thus maximum stress is effectively transferred from the bond interface to the stronger material of the chip, thereby providing a highly reliable and stable strain gage.

DETAILED DESCRIPTION OF THE INVENTION

In the present invention hereinafter disclosed, single crystal sapphire diaphragms are discussed because sapphire has higher strength. As will later be appreciated in view of the foregoing discussion, other materials including quartz may be used in place of sapphire. In the following description for purposes of explanation, specific numbers, materials, structures, etc. are set forth in order to provide a thorough understanding of the present invention. However, it will be apparent to one skilled in the art that the present invention may be practiced without these specific details.

Figure 1:
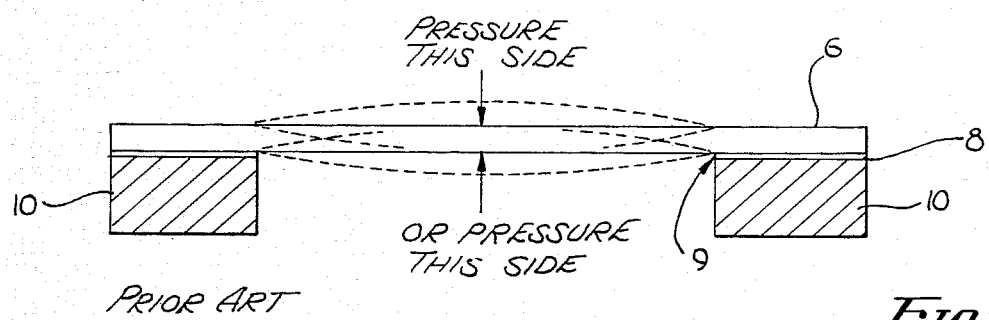
FIG. 1 illustrates a cross-sectional side view of a prior art sapphire diaphragm strain gage showing the bonding material intact.

In FIG. 1 there is shown a cross section of a typical prior art strain gage. Wheatstone bridge circuits are well known in the art and their operation, therefore, will not be described herein. The diaphragm is placed in a location where it will be subject to strain or undergo pressure. In the presently preferred embodiment, the diaphragm 6 is generally circular and about 0.2 inches in diameter and is attached to a polycrystalline aluminum oxide base 10 which is also generally circular. The aluminum oxide base 10 of FIG. 1 is adhered to the sapphire diaphragm 6 by means of a glass bonding material 8, although epoxy or other adherant methods could be used in place of the glass bond 8. The aluminum oxide base 10 defines an inner circular aperture 9 which is placed in the flow path of a pressure to be measured. It is important to note that pressure may come towards the diaphragm 6 from either side thereof, as indicated by the arrows shown in FIG. 1. In the case of the exhaust of an engine, the exhaust pressure flows against the topside of the sapphire diaphragm 6, causing a flexing downwardly thereof as shown in phantom lines in FIG. 1. Power is supplied to the Wheatstone bridge on the sapphire diaphragm 6 of the strain gage 10 by a power supply not shown. Deformation of the sapphire diaphragm 6 causes a redistribution in the resistance and therefore a change in the voltage developed across the resistance elements of the Wheatstone Bridge. The changing voltage corresponds to the degree of formation of the sapphire diaphragm 6. Since the degree of the deformation of the sapphire diaphragm 6 is also proportional to the amount of strain exerted against it at any given moment, the strain may be continuously monitored by measuring voltage drop across the Wheatstone Bridge.

Figures 2A, 2B:
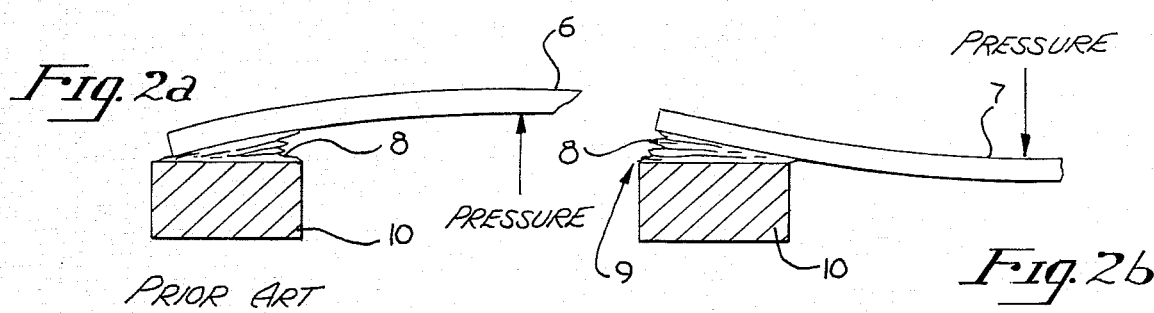
FIGS. 2a and 2b illustrate cross-sectional views of the strain gage of FIG. 1 showing the bonding material deformed.

It was discovered that serious problems and drawbacks exist in the device shown in FIG. 1. Glass has a much lower resistance to tension than sapphire, and suffers viscous flow under the radial and tangential stress at the juncture of the aperture 9. Due to hysteresis effects, this causes an error in strain or pressure reading. In operation of the prior art strain gage of FIG. 1, the glass bond deforms under tension at its bonding point between the aluminum oxide base 10 and the sapphire diaphragm 6. For example, in the present embodiment, the sapphire diaphragm 6 is typically 0.2 inches in width and requires approximately 0.001 in. of strain in order to create a maximum change in the resistance of the Wheatstone bridge. A 0.001 in. strain of a 0.2 inch sapphire diaphragm develops a stress in the glass bond of 10,000 PSI which, for the application herein described, is two to five times higher than the allowable stress level for glass. Under such strain, the glass flows over time such that eventually, the glass, after being stressed, returns to its original shape only after a long period of time. Eventually, over the course of operation of the gage, the glass remains permanently deformed. Also, the diaphragm 6 may separate from the aluminum oxide base 10 as shown in FIGS. 2a and 2b.

Figure 3:
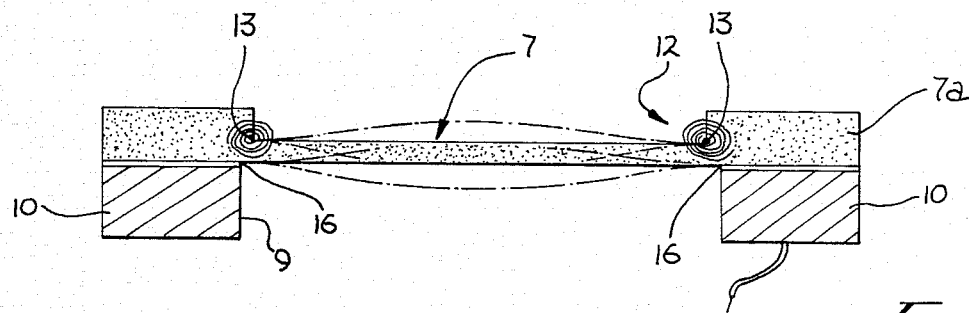
FIG. 3 illustrates a partial cross-sectional view of the sapphire diaphragm strain gage embodying the concepts of the present invention.
Figure 4:
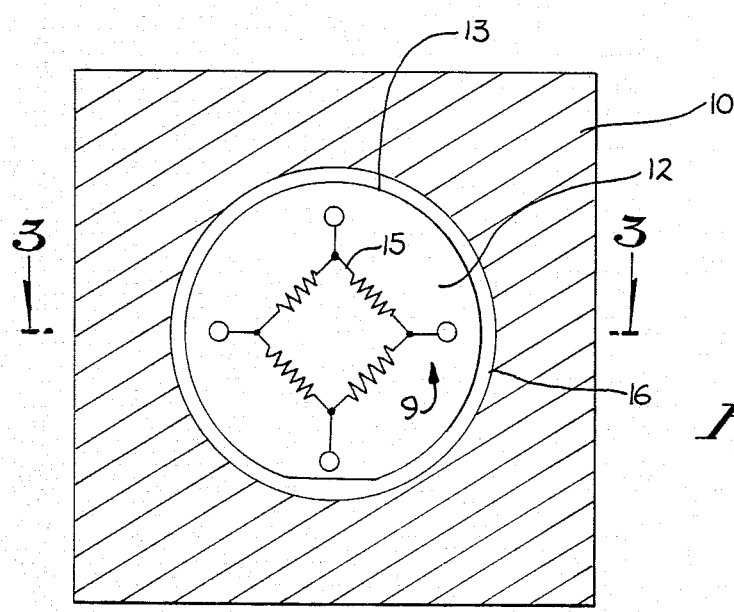
FIG. 4 illustrates a bottom plan view of the sapphire diaphragm, showing the strain gage Wheatstone bridge embodying the concepts of the present invention.

In FIG. 3 there is shown a cross-sectional side view of the improved strain gage of the present invention, which overcomes the problems associated with prior art strain gauges such as the one shown in FIGS. 1 and 2. In FIG. 4 there is shown a bottom plan view of the strain gage of FIG. 3. FIG. 4 shows a Wheatstone bridge 15 disposed on a sapphire diaphragm chip. In the presently preferred embodiment, the sapphire chip of the strain gage of FIGS. 3 and 4 is micromachined to have a recessed area 12 which forms a diaphragm 7 which is contiguous with a considerably thicker surrounding area 7a. This structure of the present invention prevents the chip from bending in the bond area 8 by transferring the radial and tangential stress to the recessed peripheral edge of the recessed area 12, denoted by reference numeral 13 in FIG. 3, thereby effectively preventing deformation at the interface between the diaphragm 7 and the base 10. Accordingly, no bending occurs at the area immediately adjacent location 13, as shown in FIGS. 3, 4, 5 and 5a. Therefore, in operation of the structure of FIGS. 3 and 4, the only significant stress in the bond 8 is compressive (not radial and tangential shear stress) and within acceptable limits. In actual practice it has been found that the offset of the peripheral edge 13 from the mating point of the base 10 (denoted by reference numeral 16) should be 1.5 times the thickness of the diaphragm 7.

The invented strain gage can be installed in a system to be measured such that the base, top or sides of the gage are coupled to the location being measured.

Figure 5:
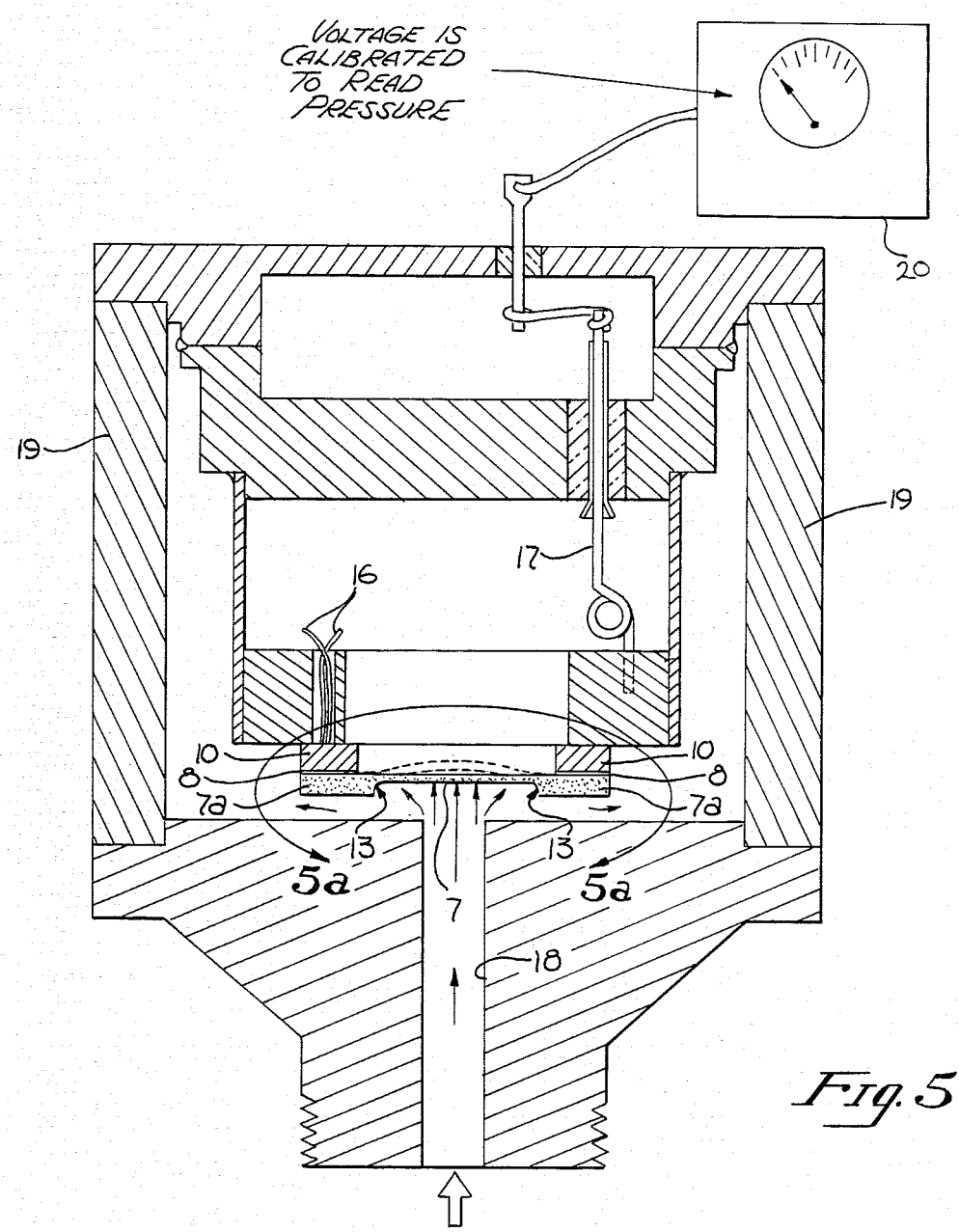
FIGS. 5 and 5a illustrate the sapphire diaphragm strain gage as shown in FIG. 3 assembled as a transducer.
Figure 5A:
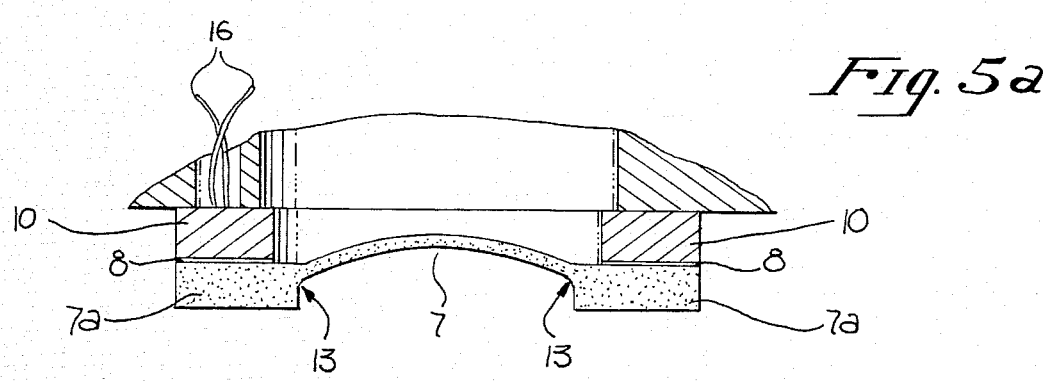

In FIG. 5 there is shown a cross-sectional side view of the invented diaphragm strain gage of the present invention installed as a pressure transducer in a fluid media in order to measure the pressure thereat. The invented strain gage is installed over a pressurized fluid line 18. The fluid (hydraulic or pneumatic) impinges upon the sapphire chip and diaphragm 7. Increasing and decreasing pressure against the diaphragm 7 causes deflection of the same, which in turn causes a redistribution of the resistance in the Wheatstone bridge 15 disposed on the sapphire diaphragm 7, and causes a redistribution of the voltage developed across the Wheatstone bridge 15. The resulting change in output voltage is transferred by sensor wire 16, which in turn is coupled to conduit 17 to ultimately transfer the voltage to a voltage measuring device 20. The voltage measuring device 20 measures the voltage across the Wheatstone bridge 15 and, since the change in voltage corresponds to the change in strain or pressure, determines the amount of strain or pressure against the sapphire diaphragm 7.

As such, it will be appreciated that the present invention may also be used to measure the differential between the two pressures, in the case where pressure is exerted against the top and the bottom of the diaphragm 7.

It has been discovered that the diaphragm chip of the present invention may also be comprised of quartz, silicon, diamond, aluminum nitride, or silicon dioxide. The base may be comprised of aluminum oxide, aluminum nitride, silicon oxide or boron nitride. Due to similar coefficients of expansion, a silicon diaphragm should be used with an aluminum nitride base. Aluminum nitride and silicon oxide diaphragms can also be constructed by hot pressing the chip diaphragm from an aluminum nitride or silicon oxide chip, thereby eliminating the need to micromachine the recessed area 12 into the chip.

It will be appreciated that the above-described invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

What is claimed is:

1. A strain gage comprising:
   a crystalline chip, said chip having a first and a second side and a recessed portion on said first side, said recessed portion having an outer periphery thereby forming a diaphragm having a predetermined thickness, said diaphragm having disposed thereon a means for conducting current in response to deformation of said diaphragm such that the current conducted by said means for conducting current varies in correspondence with the deformation of said diaphragm;
   a base portion disposed adjacent to said second side of said chip and bonded thereto with a bonding material, said base portion supporting said chip in a support area having an inner periphery concentrically offset from said outer periphery of said recessed portion by a dimension equal to at least 1.5 times the thickness of the diaphragm;

whereby upon deformation of said diaphragm, radial and tangential stress in said bonding material is reduced.

2. The apparatus according to claim 1 wherein said crystalline chip is comprised substantially of single crystal sapphire.

3. The apparatus according to claim 1 wherein said crystalline chip is comprised substantially of aluminum oxide.

4. The apparatus according to claim 1 wherein said crystalline chip is comprised substantialy of aluminum nitride.

5. The apparatus according to claim 4 wherein said aluminum nitride chip is hot pressed to thereby form said crystalline chip.

6. The apparatus according to claim 1 wherein said crystalline chip is comprised substantially of silicon.

7. The apparatus according to claim 1 wherein said crystalline chip is comprised substantially of quartz.

8. The apparatus according to claim 1 wherein said crystalline diaphragm is comprised substantially of diamond.

9. The apparatus according to claim 1 wherein said crystalline diaphragm is comprised substantially of silicon dioxide.

10. A strain gage comprising:
a single crystal sapphire chip having a first and a second side, said sapphire chip having a recess disposed within said first side thereof, said recess extending to a predetermined depth within said chip, thereby defining a diaphragm having a predetermined thickness;
a means for sensing deformation of said chip;
an aluminum oxide base portion disposed adjacent to said second side of said sapphire chip, said base portion defining an aperture larger than said recess and being coupled to said chip by a glass bond, said aperture being concentrically offset from said recess by a dimension equal to at least 1.5 times the thickness of the diaphragm such that upon deformation of said diaphragm, radial and tangential stress in said glass bond is thereby reduced.

11. The apparatus according to claim 10 wherein said means for sensing deformation of said chip comprises a Wheatstone bridge.

12. An improved strain gage comprising:
a flexible diaphragm means, said diaphragm means including a recessed portion having a predetermined thickness and an outer periphery;
a means for conducting current, said means for conducting current being responsive to flexing of said diaphragm means;
a base portion, said base portion being coupled adjacent to a side of said diaphragm means opposite said recessed portion, said base portion being coupled to said diaphragm means in a support area having an inner periphery concentrically offset from said outer periphery of said recessed portion by a dimension equal to at least 1.5 times the thickness of said recessed portion, whereby, upon deformation of said diaphragm, radial and tangential stress at the coupling of said base to said diaphragm is reduced.

* * * * *